US009744995B2

(12) United States Patent
Tanaka

(10) Patent No.: US 9,744,995 B2
(45) Date of Patent: Aug. 29, 2017

(54) SUB FRAME STRUCTURE OF VEHICLE

(71) Applicant: MAZDA MOTOR CORPORATION, Hiroshima (JP)

(72) Inventor: Masaaki Tanaka, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

(21) Appl. No.: 14/987,007

(22) Filed: Jan. 4, 2016

(65) Prior Publication Data
US 2016/0207571 A1 Jul. 21, 2016

(30) Foreign Application Priority Data
Jan. 16, 2015 (JP) ................................. 2015-006992

(51) Int. Cl.
*B62D 21/11* (2006.01)
*B62D 21/15* (2006.01)
*B60G 3/20* (2006.01)

(52) U.S. Cl.
CPC ................ *B62D 21/11* (2013.01); *B60G 3/20* (2013.01); *B62D 21/155* (2013.01); *B60G 2200/18* (2013.01)

(58) Field of Classification Search
CPC ...... B62D 21/155; B62D 24/00; B62D 7/166; B62D 21/11; B60G 7/001
See application file for complete search history.

(56) References Cited

U.S. PATENT DOCUMENTS

| 5,110,177 A * | 5/1992 | Akio ...................... | B62D 21/11 280/784 |
| 2005/0200093 A1* | 9/2005 | Komiya ................. | B62D 21/11 280/124.109 |
| 2006/0278463 A1* | 12/2006 | Anzai .................... | B62D 21/11 180/312 |
| 2012/0313360 A1* | 12/2012 | Akaki .................... | B62D 21/02 280/784 |

(Continued)

FOREIGN PATENT DOCUMENTS

JP 2013-169812 A 9/2013
JP 2014-128991 A 7/2014

OTHER PUBLICATIONS

An Office Action; "Notification of Reasons for Refusal," issued by the Japanese Patent Office on Nov. 1, 2016, which corresponds to Japanese Patent Application No. 2015-006992 and is related to U.S. Appl. No. 14/987,007; with English language translation.

*Primary Examiner* — Darlene P Condra
(74) *Attorney, Agent, or Firm* — Studebaker & Brackett PC

(57) ABSTRACT

A sub frame structure of a vehicle comprises a pair of right-and-left side members, to which a pair of right-and-left uppers-side lower arms are connected, a rear cross member holding rear ends of the side members, and a front cross member interconnecting the side members and being positioned in front of the rear cross member, being spaced apart from the rear cross member. A front end of each of the side members is rigidly connected to a floor frame, the front cross member is joined to a front side member of each of the side members, and a rear side member is provided at a portion of each of the side members which is positioned in back of the front cross member. Herein, the rear side member is configured to be weaker than the front side member.

10 Claims, 9 Drawing Sheets

(56) References Cited

U.S. PATENT DOCUMENTS

| | | | | |
|---|---|---|---|---|
| 2014/0183834 A1* | 7/2014 | Okuyama | ............... | B60G 3/20 |
| | | | | 280/124.109 |
| 2014/0333091 A1* | 11/2014 | Stockard | ............. | B62D 21/155 |
| | | | | 296/187.03 |
| 2014/0339856 A1* | 11/2014 | Obata | .................... | B62D 21/11 |
| | | | | 296/193.08 |
| 2014/0368000 A1* | 12/2014 | Komiya | ................ | B62D 21/11 |
| | | | | 296/193.07 |
| 2015/0183468 A1* | 7/2015 | Shirooka | ............. | B62D 25/082 |
| | | | | 296/187.1 |

* cited by examiner

SUB FRAME STRUCTURE OF VEHICLE

BACKGROUND OF THE INVENTION

The present invention relates to a sub frame structure of a vehicle in which a rear suspension of the vehicle is supported, for example.

In a vehicle, such as an automotive vehicle, a rear suspension connecting a rear wheel and a vehicle body performs a function of pressing the rear wheel against a road surface and another function of a shock absorber to suppress an impact of unevenness of the road surface on the vehicle body. There are various types of rear suspension performing these functions in a suspension mechanism and the like.

Japanese Patent Laid-Open Publication No. 2013-169812, for example, discloses a multi-link type of rear suspension, in which plural arm members are connected to a rear sub frame, the rear sub frame being formed in a parallel crossed shape by a pair of right-and-left side members and front-and-rear cross members which are spaced apart from each other in a vehicle longitudinal direction and interconnect the side members, respectively.

More specifically, the multi-link type of rear suspension disclosed in the above-described patent document is configured such that a front-side lower arm, a rear-side lower arm, and an upper arm, which are respectively coupled to a rear wheel via a knuckle, are connected to the rear sub frame, and a trailing arm, a front end of which is connected to a vehicle body, is connected to the knuckle.

Herein, in the multi-link type of rear suspension like the one disclosed in the above-described patent document, when an input caused by the unevenness of the road surface or the like acts on the rear wheel from a front side of a vehicle, a load is applied to the rear suspension obliquely upward and rearward.

Herein, a vertical load (load acting in a vertical direction) which is part of the above-described upward-and-rearward oblique load is absorbed by a swinging movement of the arm members, such as the front-side lower arm, and a biasing force of a suspension spring. Meanwhile, a longitudinal load (load acting in the vehicle longitudinal direction) is transmitted to the rear sub frame through the front-side lower arm and the rear-side lower arm and also transmitted to the vehicle body through the trailing arm.

Therefore, in a case in which the trailing arm of the above-described multi-link type of rear suspension of the patent document is omitted, for example, the longitudinal load transmitted to the rear sub frame through the front-side lower arm and the rear-side lower arm may increase.

In this case in which the longitudinal load transmitted to the rear sub frame increases, it is necessary to improve the strength of the side member against the longitudinal load. However, if the side member's strength is improved, there is a problem that the side member may not serve as a collision-load absorbing member properly in a vehicle rear collision.

SUMMARY OF THE INVENTION

The present invention has been devised in view of the above-described problem, and an object of the present invention is to provide a sub frame structure of a vehicle which can properly ensure the strength against the longitudinal load transmitted through the arm member and also properly absorb the collision load in the vehicle rear collision.

The present invention is a sub frame structure of a vehicle, comprising a pair of right-and-left side members extending in a vehicle longitudinal direction, to which a pair of right-and-left arm members supporting right-and-left rear wheels are pivotally connected, a rear cross member holding the vicinity of respective rear ends of the pair of right-and-left side members, and a front cross member interconnecting the pair of right-and-left side members in a vehicle width direction and being positioned in front of the rear cross member, being spaced apart from the rear cross member, wherein a front end of each of the side members is rigidly connected to a vehicle body, the front cross member is joined to each of the side members at a position located in back of the vicinity of the front end of the side member, and a weak portion is provided at a portion of each of the side members which is positioned in back of the front cross member, the weak portion being configured to be weaker than another portion of each of the side members which is positioned in front of the front cross member.

Herein, the above-described weak portion can be made by making its plate thickness thinner than that of the portion of the side member positioned in front of the front cross member or by forming it with a constriction, for example.

According to the present invention, the strength against the longitudinal load transmitted through the arm member can be properly ensured, and also the collision load can be properly absorbed in the vehicle rear collision. Specifically, when an object collides with the rear ends of the pair of right-and-left side members or the rear cross member in the vehicle rear collision, the present sub frame structure of the vehicle can make the weak portion of the side member deform toward a vehicle forward side between the front cross member and the rear cross member.

Thereby, the present sub frame structure of the vehicle can properly absorb the rear-collision load by the deformation of the weak portion, and transmit the collision load to the vehicle body by way of the portion of the side member positioned in front of the front cross member.

Meanwhile, since the longitudinal load caused by the road-surface input is smaller than the rear-collision load, even in a case in which the arm member is connected to the weak portion of the side member, for example, the present sub frame structure of the vehicle can surely transmit the longitudinal load transmitted through the arm member to the vehicle body.

Accordingly, the present sub frame structure of the vehicle can properly ensure the strength against the longitudinal load transmitted through the arm member and also properly absorb the collision load in the vehicle rear collision.

In an embodiment of the present invention, a portion of each of the side members which is positioned between the front cross member and the rear cross member is configured to slant inward, in the vehicle width direction, relative to a vehicle longitudinal direction in a plan view.

According to this embodiment, the present sub frame structure of the vehicle can easily make the side member between the front cross member and the rear cross member deform by means of the collision load in the vehicle rear collision.

Thereby, the present sub frame structure of the vehicle can promote the deformation of the weak portion by means of the collision load by the deformation of the side member between the front cross member and the rear cross member. Accordingly, the present sub frame structure of the vehicle can more surely absorb the collision load in the vehicle rear collision.

In another embodiment of the present invention, the side members are provided to protrude rearward beyond the rear cross member.

According to this embodiment, the present sub frame structure of the vehicle can make the rear end of the side member collide with an obstacle first in the vehicle rear collision.

Thereby, the present sub frame structure of the vehicle can make the collision load be applied (inputted) to the side member directly, so that the weak portion of the side member can be made to deform easily and surely.

Further, since the weak portion can be made to deform easily, the present sub frame structure of the vehicle can prevent the weak portion from being designed to be excessively weak, the strength against the longitudinal load transmitted through the arm member can be ensured more stably.

Therefore, even in a case in which the arm member is coupled to the weak portion of the side member, for example, the present sub frame structure of the vehicle can transmit the longitudinal load transmitted through the arm member to the vehicle body more surely.

Accordingly, the present sub frame structure of the vehicle can ensure the strength against the longitudinal load transmitted through the arm member more stably and also absorb the collision load in the vehicle rear collision more surely.

In another embodiment of the present invention, each of the side members is formed in a roughly tubular shape having an inside hollow space, and a thickness of the weak portion of the side member is configured to be thinner than that of the portion of the side member positioned in front of the front cross member.

According to this embodiment, the present sub frame structure of the vehicle can ensure the strength against the longitudinal load transmitted through the arm member and also form the weak portion more easily.

Other features, aspects, and advantages of the present invention will become apparent from the following description which refers to the accompanying drawings.

DETAILED DESCRIPTION OF THE INVENTION

Figure 1:
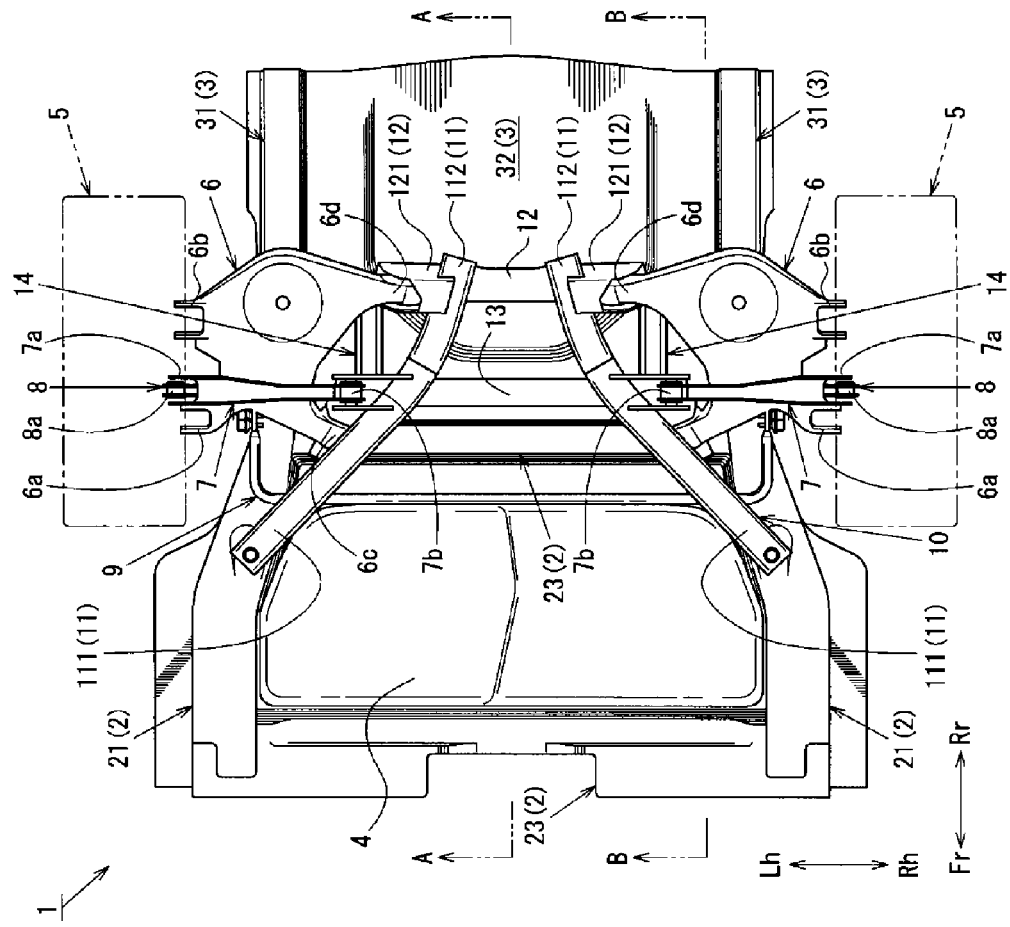
FIG. 1 is a bottom view of a rear sub frame in a state in which the rear sub frame is attached to a vehicle body.
Figure 2:
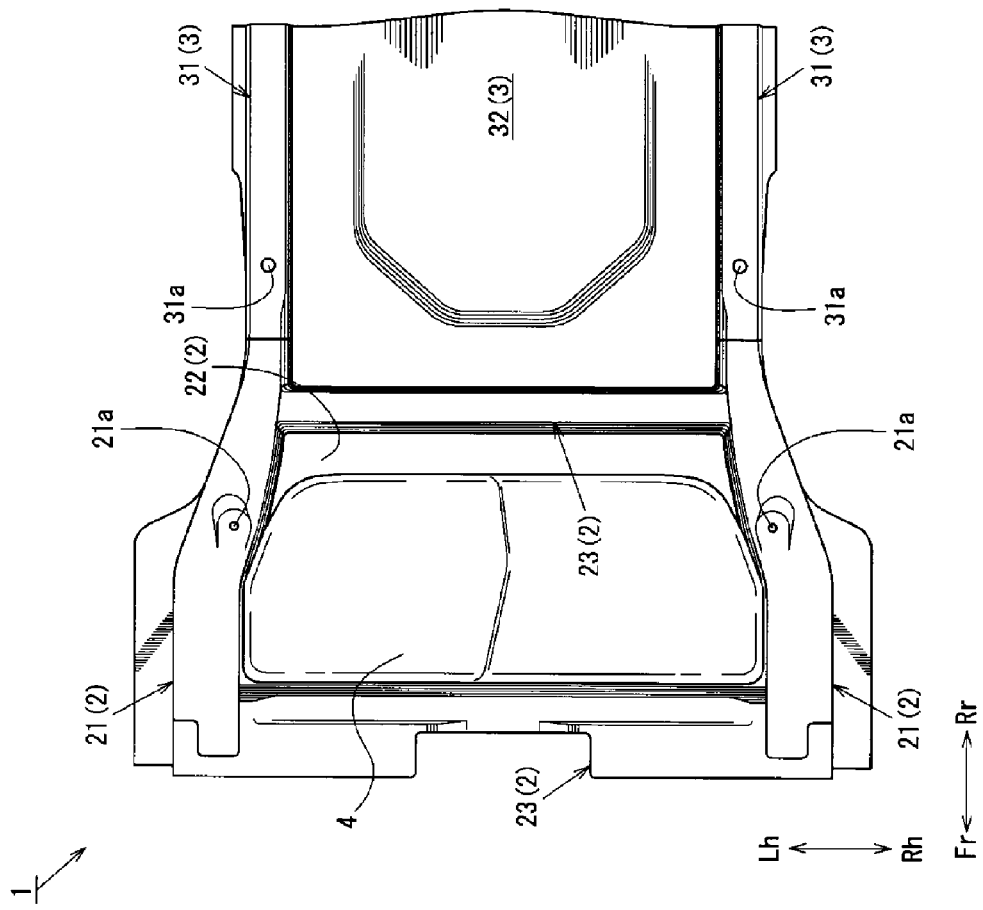
FIG. 2 is a bottom view of the vehicle body in a state in which the rear sub frame is detached.
Figure 4:
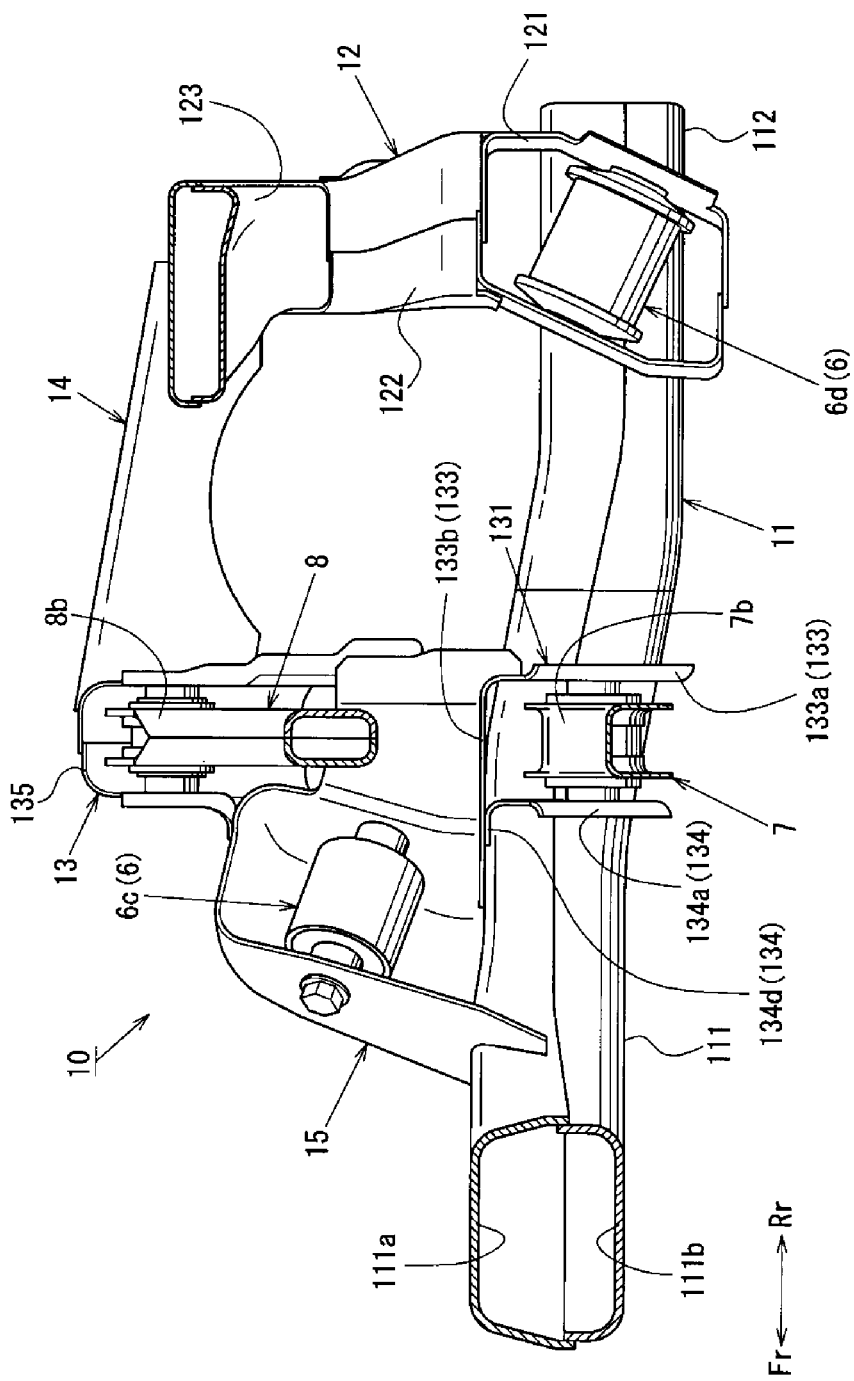
FIG. 4 is a sectional view taken along line B-B of FIG. 1.
Figure 5:
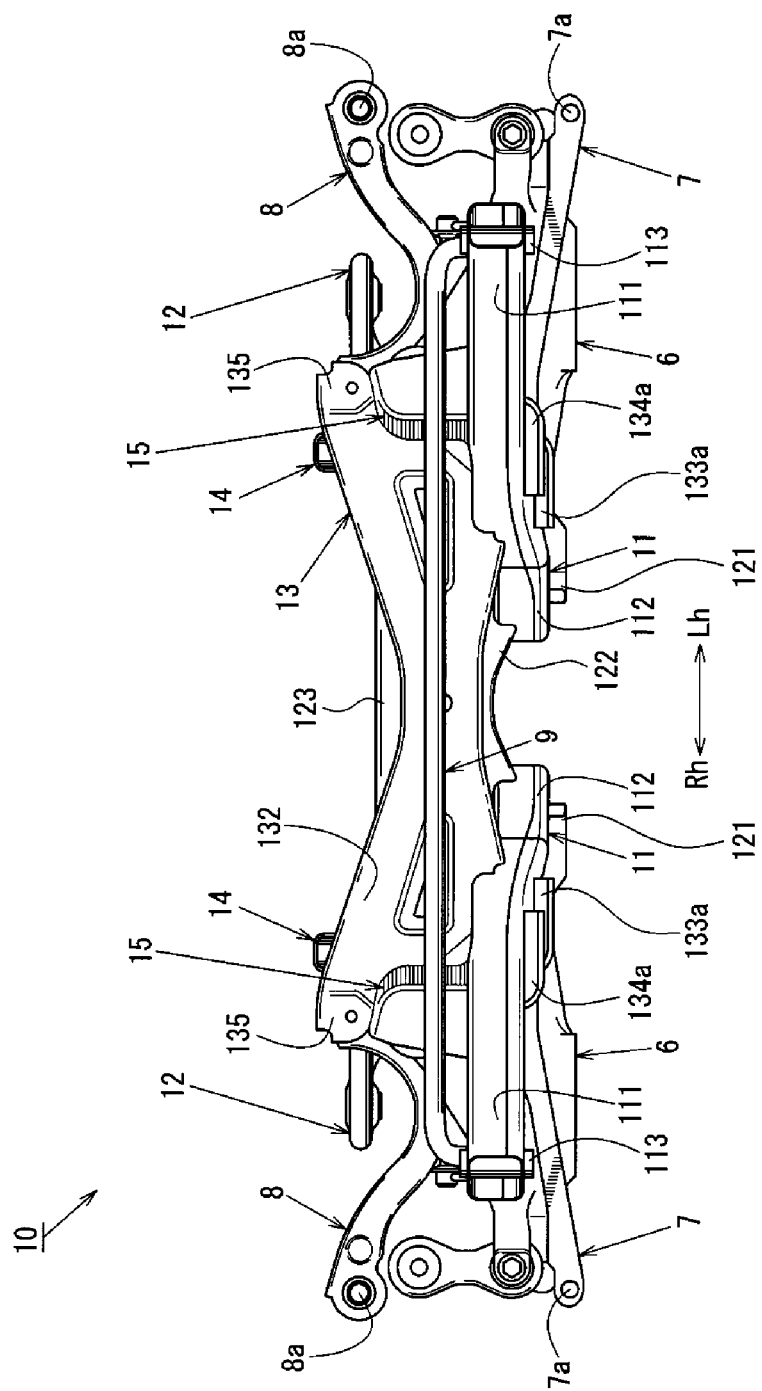
FIG. 5 is a front view of the rear sub frame.

Hereafter, an embodiment of the present invention will be described referring to the drawings. FIG. 1 is a bottom view of a rear sub frame 10 in a state in which the rear sub frame 10 is attached to a vehicle body, FIG. 2 is a bottom view of the vehicle body in a state in which the rear sub frame 10 is detached, FIG. 3 is a sectional view taken along line A-A of FIG. 1, FIG. 4 is a sectional view taken along line B-B of FIG. 1, and FIG. 5 is a front view of the rear sub frame 10.

Figure 6:
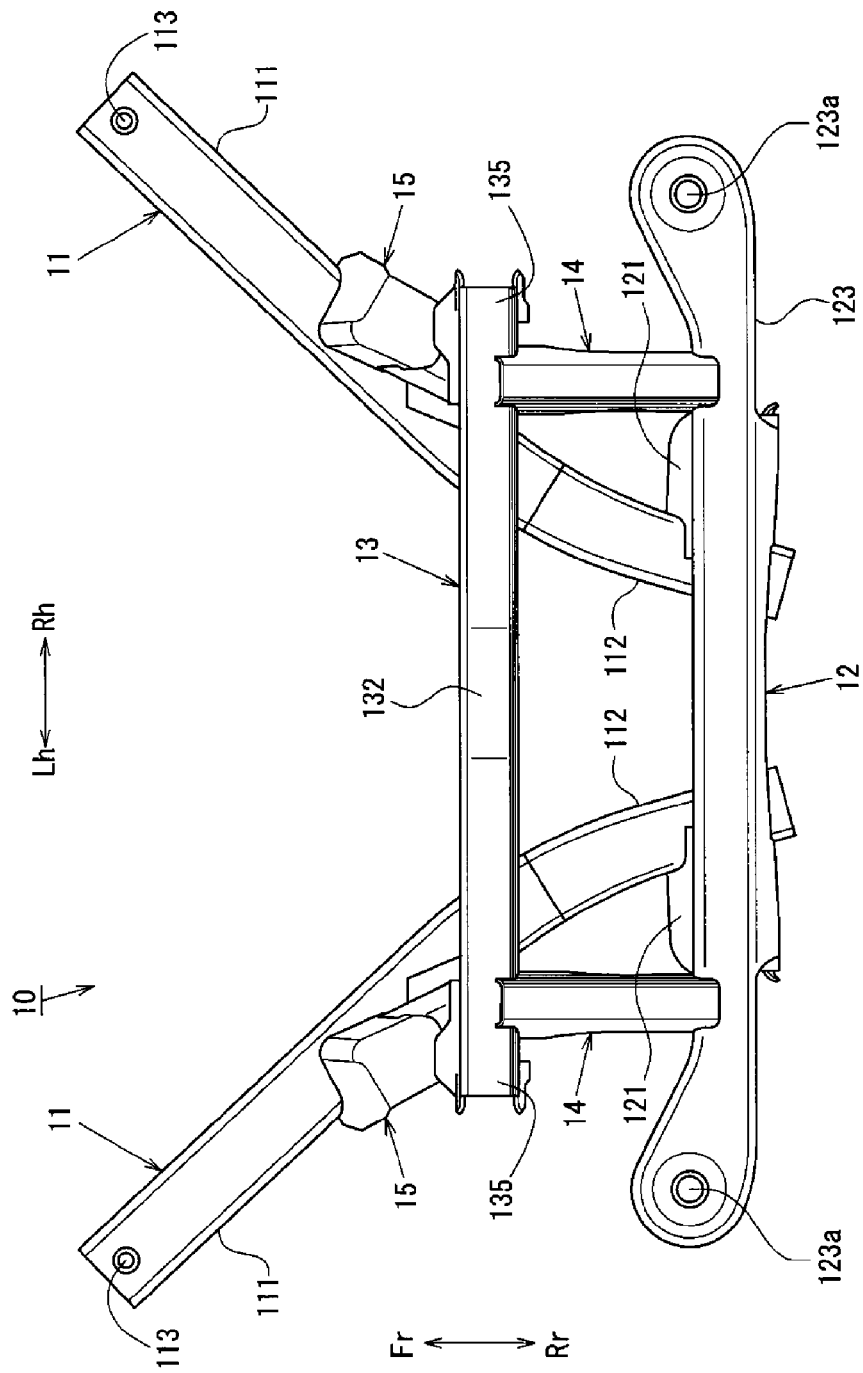
FIG. 6 is a plan view of the rear sub frame.
Figure 7:
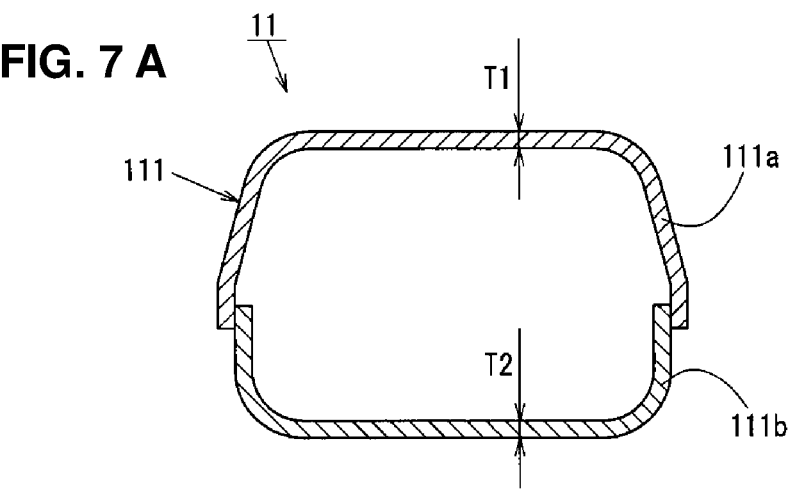
FIG. 7A is a sectional view of a front side member.
FIG. 7B is a sectional view of a rear side member.
Figure 7:
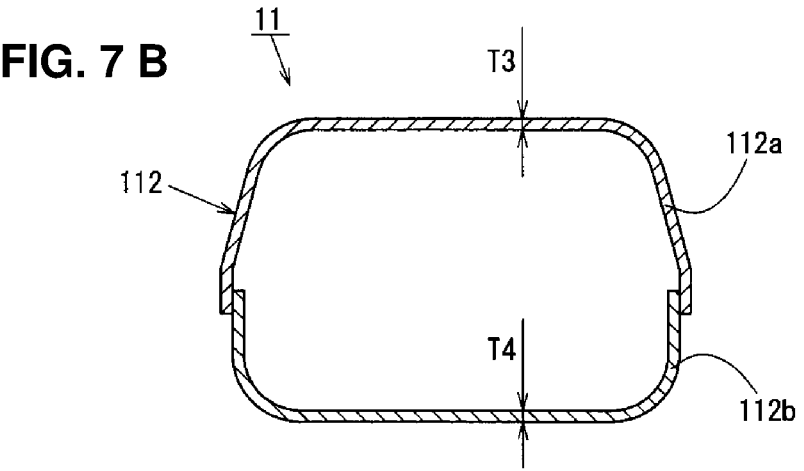
Figure 8:
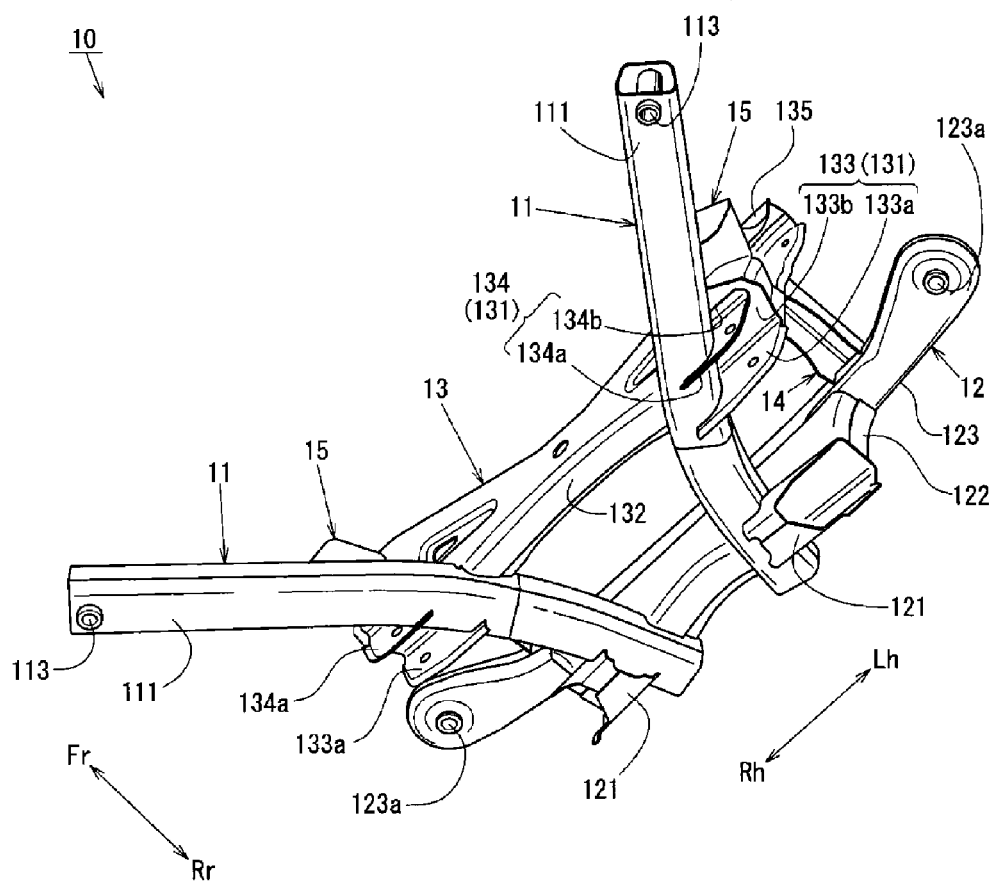
FIG. 8 is a perspective view of the rear sub frame, when viewed from below.
Figure 9:
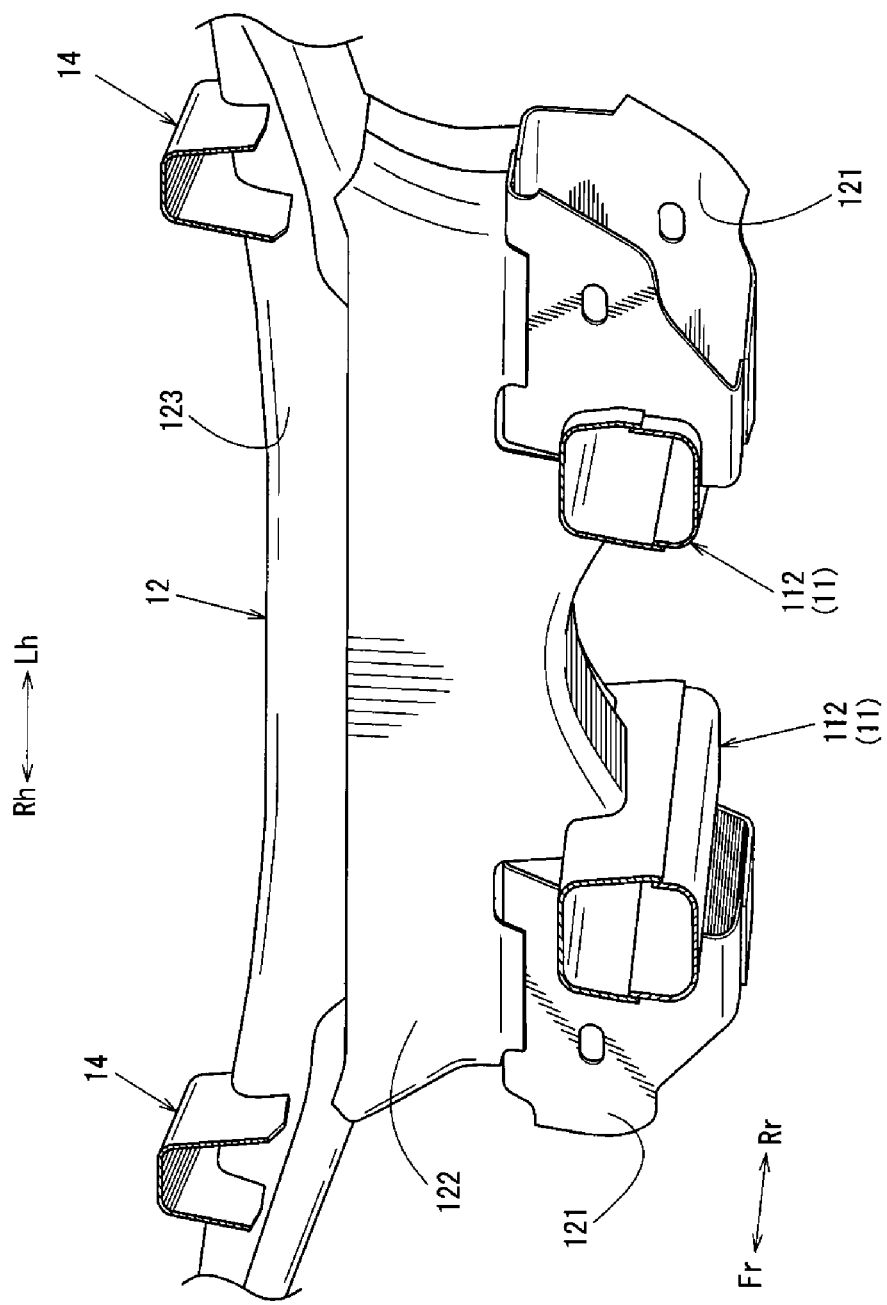
FIG. 9 is a perspective view of a rear cross member.

Further, FIG. 6 is a plan view of the rear sub frame 10, FIG. 7A is a sectional view of a front side member 111 and FIG. 7B is a sectional view of a rear side member 112, FIG. 8 is a perspective view of the rear sub frame 10, when viewed from below, and FIG. 9 is a perspective view of a rear cross member 12.

Figure 3:
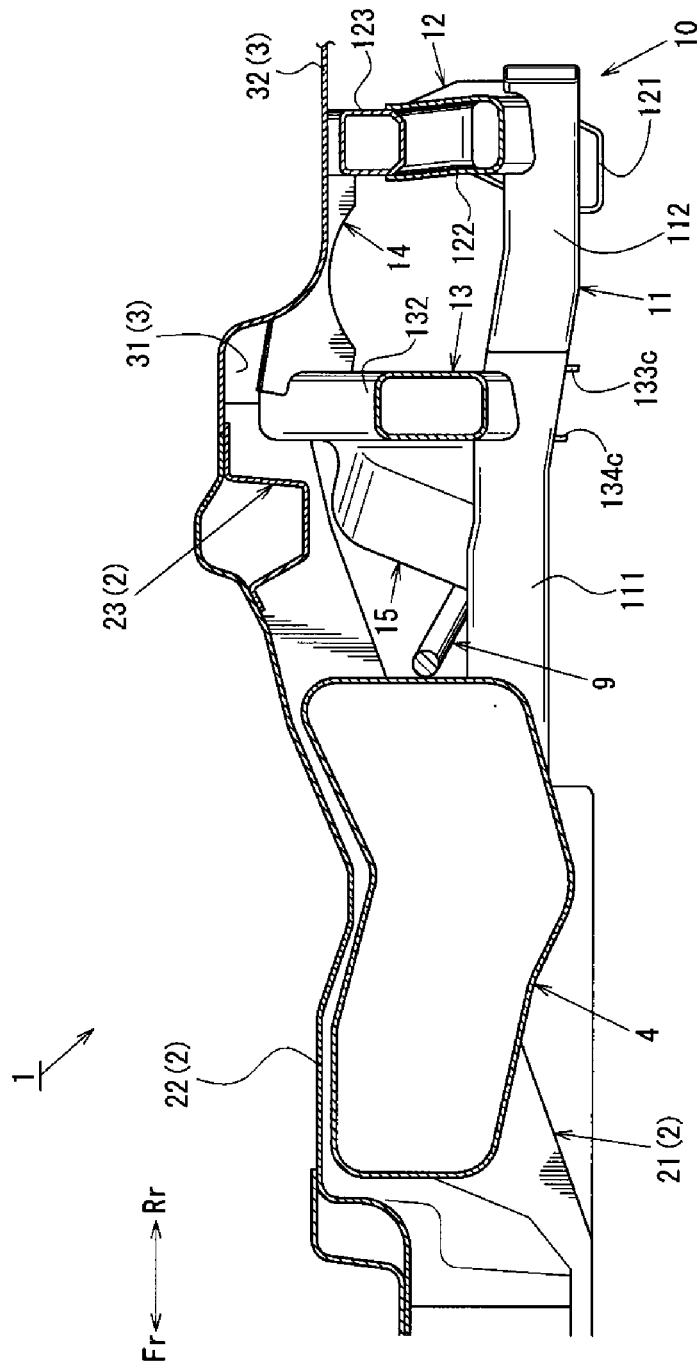
FIG. 3 is a sectional view taken along line A-A of FIG. 1.

Herein, illustrations of an upper-side lower arm 6, a lower-side lower arm 7, and an upper arm 8 are omitted in FIG. 3 just for clarification. Further, in FIG. 4, illustration of a vehicle body is omitted and only a front connection portion 6c and a rear connection portion 6d of the upper-side lower arm 6 are illustrated.

In the figures, an arrow Fr shows a vehicle forward direction, an arrow Rr shows a vehicle rearward direction, an arrow Rh shows a vehicle rearward direction, and an arrow Lh shows a vehicle leftward direction. Additionally, an upper side of FIG. 3 is a vehicle upper side and a lower side of FIG. 3 is a vehicle lower side.

First, a lower part of a cabin portion 2 of a vehicle 1 and a lower part of a vehicle rear portion 3 which is positioned in back of the cabin portion 2 will be described. As shown in FIGS. 1 through 3, the lower part of the cabin portion 2 of the vehicle 1 extends in the vehicle longitudinal direction and comprises a pair of right-and-left floor frames 21 as a frame member which forms a vehicle body, a floor panel 22 which is arranged between the both floor frames 21, and a vehicle-body side cross member 23 which interconnects, in the vehicle width direction, respective portions of the floor frames 21 which are positioned near rear ends of the floor frames 21.

Further, at the lower part of the cabin portion 2 is provided a fuel tank 4 in front of the vehicle-body side cross member 23 between the right-and-left floor frames 21. The right-and-left floor frames 21 respectively have a rectangular closed cross section extending rearward, each rear end of which rises obliquely upward and then extends rearward.

Moreover, at the lower part of the floor frame 21 is provided, as shown in FIG. 2, a vehicle-body side front rigid-connection portion 21a which accepts a fastening bolt (not illustrated) and to which a front end (which will be described later) of the rear sub frame 10 is rigidly connected. The vehicle-body side front rigid-connection portion 21a is positioned in front of the vehicle-body side cross member 23 and also a rear end of the fuel tank 4.

The vehicle-body side cross member 23 has a hat-shaped cross section opening upward which extends in the vehicle width direction. This vehicle-body side cross member 23 is fixedly welded to the floor panel 22 and respective side faces of the right-and-left floor frames 21, thereby serving as a reinforcing member for reinforcing the vehicle body. Herein, the vehicle-body side cross member 23 forms a closed cross section together with the lower face of the floor panel 22.

Meanwhile, as shown in FIGS. 2 and 3, the lower part of the vehicle rear portion 3 of the vehicle 1 is configured by a pair of right-and-left rear side frames 31 which extend rearward from respective rear ends of the right-and-left floor frames 21 and serve as a frame member of the vehicle body and a rear floor panel 22 which is provided between the rear side frames 31 and forms a floor face of the vehicle.

As shown in FIGS. 2 and 3, the right-and-left rear side frames 31 are the frame member that is continuous from the right-and-left floor frames 21, and respectively have a rectangular closed cross section which extends rearward from each rear end of the floor frames 21. This rear side frame 31 is configured as shown in FIG. 3 such that its lower face is located at a higher level than the vehicle-body side front rigid-connection portion 21a of the floor frame 21 in a side view.

Moreover, at the lower part of the rear side frame 31 is provided, as shown in FIG. 2, a vehicle-body side rear rigid-connection portion 31a which accepts a fastening bolt (not illustrated) and to which a rear end (which will be described later) of the rear sub frame 10 is rigidly connected. The vehicle-body side rear rigid-connection portion 31a is positioned in back of the vehicle-body side cross member 23, being spaced apart from the vehicle-body side cross member 23.

As shown in FIGS. 1 and 3, the rear sub frame 10, to which a pair of right-and-left upper-side lower arms 6, a pair of right-and-left lower-side lower arms 7, and a pair of right-and-left upper arms 8 which are respectively connected to right-and-left rear wheels 5 through right-and-left knuckles (not illustrated) are pivotally connected, is rigidly connected to the floor frames 21 and the rear side frames 31 at the lower part of the above-described vehicle rear portion 3.

As shown in FIG. 1, the upper-side lower arm 6 is an A-shaped arm member, and includes two rear-wheel side connection portions 6a, 6b to be connected to the knuckle at its outward side and front-and-rear connection portions 6c, 6d to be connected to the rear sub frame 10 at its inward side.

Further, as shown in FIGS. 1 and 3, a stabilizer 9 is attached to a vehicle front side along the rear end of the fuel tank 4 at a level between the floor frames 21 and the rear sub frame 10 in a vehicle vertical direction.

As shown in FIGS. 1 and 4, the lower-side lower arm 7 has a gate-shaped cross section opening downward which extends in the vehicle width direction, and is arranged below the upper-side lower arm 6. This lower-side lower arm 7 includes a rear-wheel side connection portion 7a to be connected to the knuckle at its outward side and a sub-frame side connection portion 7b to be connected to the rear sub frame 10 at its inward side.

As shown in FIGS. 4 and 5, the upper arm 8 is arranged above the lower-side lower arm 7 and has a rectangular closed cross section having a longer side in the vehicle vertical direction. The upper arm 8 extends in the vehicle width direction and is configured in a curve shape such that it protrudes downward in a front view. This upper arm 8 includes a rear-wheel side connection portion 8a to be connected to the knuckle at its outward side and a sub-frame side connection portion 8b to be connected to the rear sub frame 10 at its inward side.

The rear sub frame 10 comprises, as shown in FIGS. 1, 4 and 6, a pair of right-and-left side members 11 which are configured to extend obliquely forward and outward from rear ends thereof, a rear cross member 12 which interconnects respective portions of the right-and-left side members 11 which are positioned near the respective rear ends of the side members 11, a front cross member 13 which interconnects the right-and-left side members 11 at a position which is located in front of the rear cross member 12, being spaced apart from the rear cross member 12, and a pair of right-and-left upper members 14 which respectively connect an upper portion of the rear cross member 12 and an upper portion of the front rear cross member 13 in the vehicle longitudinal direction.

As shown in FIGS. 1, 4 and 6, each of the side members 11, which is formed as a cylindrical member, is configured in a curve shape such that a central portion, in the vehicle longitudinal direction, thereof protrudes inward in a bottom view. Herein, the front cross member 13, which will be described, is connected to respective curve portions of the right-and-left side members 11.

Further, as shown in FIGS. 3 and 4, the side member 11 is configured in a step (bending) shape such that a portion thereof which is located near the rear cross member 12 is positioned below a portion thereof which is located near a front support bracket 15, which will be described later, in a side view.

More specifically, a portion of the side member 11 which is located in back of the front support bracket 15 bends downward and then bends rearward between the front support bracket 15 and the rear cross member 12.

That is, the rear portion of the side member 11 located in back of the front support bracket 15 includes a bending portion which bends downward and another bending portion which bends rearward, whereby the side member 11 is configured in the step (bending) shape in the side view.

The right-and-left side members 11 are configured to extend obliquely forward and outward from their rear ends such that a distance between their rear ends is relatively small and a distance between their front ends is relatively large.

The front side member 111 and the rear side member 112 are jointly welded together such that the side member 11 is formed integrally.

The front side member 111 is provided to extend from the front end of the side member 11 to the curve portion, and connected to the front cross member 13 at the vicinity of its rear end. That is, the front side member 111 is configured in a long shape such that its front part extends obliquely forward and outward, in the vehicle width direction, from the front cross member 13.

The front side member 111 comprises, as shown in FIG. 7A, an upper panel 111a which has a U-shaped cross section opening downward and a lower panel 111b which has a U-shaped cross section opening upward, which are joined together at their side faces so as to provide a closed cross section of the front side member 111. Herein, a plate thickness T1 of the upper panel 111a is roughly equal to a plate thickness T2 of the lower panel 111b, and the plate thickness of those are set at values necessary for transmitting a collision load caused by a vehicle rear collision, for example.

Further, as shown in FIGS. 6 and 8, the front end of the front side member 111 has a front fastening hole 113, into which a fastening bolt (not illustrated) to be screwed to the vehicle-body side front rigid-connection portion 21a of the floor frame 21 is inserted. The front fastening hole 113 is formed by an inside space of a metal-made cylindrical body which is provided at the front side member 111 such that it penetrates the front side member 111 vertically.

The rear side member 112 is, as shown in FIGS. 1 and 6, configured in the step (bending) shape in the side face such that it extends slightly inward and rearward from the rear end of the front side member 111.

The rear side member 112 has a longitudinal length which is shorter than the front side member 111 and such that it projects rearward beyond a rear face of the rear cross member 12.

The rear side member 112 comprises, as shown in FIG. 7B, an upper panel 112a which has a U-shaped cross section opening downward and a lower panel 112b which has a U-shaped cross section opening upward, which are joined together at their side faces so as to provide a closed cross section of the rear side member 112.

Herein, a plate thickness T3 of the upper panel 112a is roughly equal to a plate thickness T4 of the lower panel 112*b*, and the plate thickness of those are set to be thinner than the plate thickness T1, T2. That is, the rear side member 112 is configured to be weaker than the front side member 111 against the collision load caused by the vehicle rear collision, for example.

To an upper face of the side member 11 described above is, as shown in FIG. 4, fixedly welded the front support bracket 15 at which the front connection portion 6*c* of the upper-side lower arm 6 is supported.

More specifically, the front support bracket 15 is positioned close to a front side of the front cross member 13, and is fixedly welded to an upper face of the front side member 111 and the front cross member 13.

The front support bracket 15, which is of a boxy shape which opens outward, is configured to provide attachment of the front connection portion 6*c* of the upper-side lower arm 6 by using a fastening bolt (not illustrated) so that the upper-side lower arm 6 can rotate (swing) obliquely upward and rearward as well as obliquely downward and forward.

The rear cross member 12 serves as a holding member for holding the side member 11 in a state in which the rear ends of the right-and-left side members 11 project rearward, a connecting member for connecting the side member 11 to the rear side frame 31, and a support member for pivotally supporting the upper-side lower arm 6, as shown in FIGS. 1 and 5.

Specifically, the rear cross member 12 comprises, as shown in FIGS. 4, 6 and 9, a pair of right-and-left rear member holding members 121 which hold the vicinity of the respective rear ends of the right-and-left side members 11, a rear connecting member 122 which connects the rear member holding members 121 and the right-and-left side members 11, and an upper connecting member 123 which interconnects the vehicle-body side rear rigid-connection portions 31*a* of the right-and-left rear side frames 31 in the vehicle width direction, which are integrally welded together.

As shown in FIGS. 6 and 9, the rear member holding member 121 is made of two metal-made plates which has been bent and attached in the vehicle longitudinal direction and formed in a cylindrical shape having an axis extending in the vehicle width direction. An inward end, in the vehicle width direction, of the rear member holding member 121 is configured in a recess shape such that it contacts an upper face, an outward side face, and a lower face of the rear side member 112 and is welded to these faces.

Further, an outward end, in the vehicle width direction, of the rear member holding member 121 is configured to provide attachment of the rear connection portion 6*d* of the upper-side lower arm 6 by using a fastening bolt (not illustrated) on the outward side of the side member 11 so that the upper-side lower arm 6 can rotate (swing) obliquely upward and rearward as well as obliquely downward and forward.

That is, the rear member holding member 121 serves as a member for holding the rear side member 112 and also a rear support bracket for pivotally supporting the upper-side lower arm 6.

As shown in FIGS. 4 and 9, the rear connecting member 122 is made of two metal-made plates which has been bent and attached in the vehicle longitudinal direction and formed in a rectangular shape, in the front view, having a specified thickness in the vehicle longitudinal direction and an inside hollow space opening upward.

A lower portion of the rear connecting member 122 is configured to contact an upper portion of the rear member holding member 121 and upper and inward side faces of the rear side member 112, and be welded to these portions (faces).

As shown in FIGS. 4, 6 and 9, the upper connecting member 123 is made of two metal-made plates which has been bent and attached in the vehicle vertical direction and formed in a long-oval shape, in the plan view, having a specified thickness in the vehicle vertical direction and an inside hollow space, which is longer than the rear connecting member 122 in the vehicle width direction.

The upper connecting member 123 has, as shown in FIGS. 6 and 8, a pair of rear fastening holes 123*a*, into which a fastening bolt (not illustrated) to be screwed to the vehicle-body side rear rigid-connection portion 31*a* of the floor frame 21 is inserted at its both ends. Each of the rear fastening holes 123*a* is formed by an inside space of a metal-made cylindrical body which is provided at the end of the upper connecting member 123 such that it penetrates the upper connecting member 123 vertically.

The front cross member 13 pivotally supports the lower-side lower arm 7 and serves as a member for interconnecting the right-and-left side members 11 as shown in FIGS. 4, 5 and 8.

Specifically, the front cross member 13 comprises a pair of right-and-left front member holding members 131 which hold the vicinity of the respective rear ends of the right-and-left front side members 111, that is—hold the curve portions of the right-and-left side members 11, and a front connecting member 132 which interconnects the front member holding members 131 in the vehicle width direction, which are integrally welded together.

The front member holding member 131 comprises, as shown in FIGS. 4 and 8, a first hold portion 133 which is positioned on the vehicle rear side and a second hold portion 134 which is provided to face the first hold portion 133, which are integrally formed. The first hold portion 133 comprises a first holding portion 133*a* which is of a flat-plate shape and has a cutout on its inward side and a first joint portion 133*b* which is of a flat-plate shape and formed by bending an upper end of the first holding portion 133*a* toward the vehicle front at a roughly right angle, which are arranged along the outward side face and the lower face of the side member 11 and formed integrally.

The second holding member 134 comprises a second holding portion 134*a* which is of a flat-plate shape and has a cutout on its inward side and a second joint portion 134*b* which is of a flat-plate shape and formed by bending an upper end of the second holding portion 134*a* toward the vehicle front at a roughly right angle, which are arranged along the outward side face and the lower face of the side member 11 and formed integrally. The first hold portion 133 and the second hold portion 134 form the front member holding member 131 by fixedly welding the second joint portion 134*b* of the second hold portion 134 to a lower face of the first joint portion 133*b* of the first hold portion 133.

Herein, the first holding portion 133*a* of the first hold portion 133 and the second holding portion 134*a* of the second hold portion 134 of the front member holding member 131 form together a lower-side lower-arm support bracket (not illustrated) which provides attachment of the sub-frame side connection portion 7*b* of the lower-side lower arm 7 by using a fastening bolt (not illustrated) so that the lower-side lower arm 7 can rotate (swing) vertically. In the above-described front member holding member 131, the first joint portion 133*b* of the first hold portion 133 is fixedly welded to the upper face of the side member 11, respective inward sides of the first holding portion 133*a* of the first hold portion 133 and the second holding portion 134a of the second hold portion 134 are fixedly welded to the outward side face and the lower face of the side member 11. That is, the front member holding member 131 serves as a holding member for holding the side member 11 and also a support bracket for pivotally supporting the lower-side lower arm 7.

As shown in FIGS. 3 through 5, the front connecting member 132 is made of two metal-made plates which has been bent and attached in the vehicle vertical direction and formed in an X shape, in the front view, having a specified thickness in the vehicle longitudinal direction and an inside hollow space. A lower end of the front connecting member 132 is configured such that it contacts upper and inward side faces of the front side member 111 and is welded to these faces.

Further, at the vicinity of an outward end, in the vehicle width direction, of the front connecting member 132 is provided an upper-arm attachment portion 135 which provides attachment of the sub-frame side connection portion 8b of the upper arm 8 by using a fastening bolt (not illustrated) so that the upper arm 8 can rotate (swing) vertically.

The right-and-left upper members 14 are, as shown in FIG. 6, arranged on the outward side of the side members 11 in the plan view, and each of the upper members 14 interconnects the vicinity of the outward side of the upper portion of the front cross member 13 and the upper portion of the rear cross member 12 in the vehicle longitudinal direction.

The upper member 14 is configured in a gate shape which opens downward in the front view such that it extends in the vehicle longitudinal direction as shown in FIGS. 6 and 8. The upper member 14 is formed and welded so as to ensure a bending rigidity against an input load which is inputted through the upper-side lower arm 6, the lower-side lower arm 7, and the upper arm 8, and provide weakness against the collision load from the vehicle rear.

The present sub frame structure of the vehicle 1 described above can properly ensure the strength against the longitudinal load transmitted through the upper-side lower arm 6 and also properly absorb the collision load in the vehicle rear collision.

Specifically, when an object collides with the rear ends of the pair of right-and-left side members 11 or the rear cross member 12 in the vehicle rear collision, the present sub frame structure of the vehicle 1 can make the rear side member 112 of the side member 11 deform toward the vehicle forward side between the front cross member 13 and the rear cross member 12.

Thereby, the present sub frame structure of the vehicle 1 can properly absorb the rear-collision load by the deformation of the rear side member 112, and transmit the collision load to the floor frame 21 by way of the front side member 111.

Meanwhile, since the longitudinal load by the road-surface input is smaller than the rear-collision load, even in a case in which the upper-side lower arm 6 is connected to the rear side member 112 of the side member 11, for example, the present sub frame structure of the vehicle 1 can surely transmit the longitudinal load transmitted through the upper-side lower arm 6 to the floor frame 21.

Accordingly, the present sub frame structure of the vehicle 1 can properly ensure the strength against the longitudinal load transmitted through the upper-side lower arm 6 and also properly absorb the collision load in the vehicle rear collision.

Further, since the portion of the side member 11 which is positioned between the front cross member 13 and the rear cross member 12 is configured to slant inward, in the vehicle width direction, relative to the vehicle longitudinal direction in the plan view, the present sub frame structure of the vehicle 1 can easily make the side member 11 between the front cross member 13 and the rear cross member 12 deform by means of the collision load in the vehicle rear collision.

Thereby, the present sub frame structure of the vehicle 1 can promote the deformation of the rear side member 112 by means of the collision load. Accordingly, the present sub frame structure of the vehicle 1 can more surely absorb the collision load in the vehicle rear collision.

Also, since the side member 11 is provided to protrude rearward beyond the rear cross member 12, the present sub frame structure of the vehicle 1 can make the rear end of the side member 11 collide with an obstacle first in the vehicle rear collision.

Thereby, the present sub frame structure of the vehicle 1 can make the collision load be applied (inputted) to the side member 11 directly, so that the rear side member 112 of the side member 11 can be made to deform easily and surely.

Further, since the rear side member 112 can be made to deform easily, the present sub frame structure of the vehicle 1 can prevent the rear side member 112 from being designed to be excessively weak, the strength against the longitudinal load transmitted through the upper-side lower arm 6 can be ensured more stably.

Therefore, even in a case in which the upper-side lower arm 6 is coupled to the rear side member 112 of the side member 11, for example, the present sub frame structure of the vehicle 1 can transmit the longitudinal load transmitted through the upper-side lower arm 6 to the floor frame 21 more surely.

Accordingly, the present sub frame structure of the vehicle 1 can ensure the strength against the longitudinal load transmitted through the upper-side lower arm 6 more stably and also absorb the collision load in the vehicle rear collision more surely.

Moreover, since the thickness T3, T4 of the rear side member 112 is configured to be thinner than the thickness T1, T2 of the front side member 111, the present sub frame structure of the vehicle 1 can ensure the strength against the longitudinal load transmitted through the upper-side lower arm 6 and also form the rear side member 112 which is weaker than the front side member 111 more easily.

While the side member 11 is rigidly connected to the floor frame 21 in the above-described embodiment, the present invention is not limited to this structure, and the side member 11 may be rigidly connected to any frame member forming the vehicle body other than the floor frame 21, or any reinforcing member other than the vehicle-body side cross member 23. Alternatively, the side member 11 may be rigidly connected to a reinforcing member which reinforces a joint position of the frame member and the reinforcing member of the vehicle body.

Also, while the fuel tank 4 is provided in front of the rear sub frame 10 in the above-described embodiment, the present invention is not limited to this, and a fuel tank of gasoline or hydrogen, a rechargeable battery of an electrical automotive vehicle, or the like may be provided instead. Moreover, while the rear cross member 12 comprises the rear member holding member 121, the rear connection member 122, and the upper connecting member 123, it may be formed by an integral member instead.

Further, while the rear-side support bracket to pivotally support the rear connection portion 6d of the upper-side lower arm 6 is integrally formed with the rear member holding member 121, it may be formed separately from the rear member holding member 121, i.e., the rear cross member 12. In this case, it is preferable that the rear support bracket be arranged near the rear cross member 12.

Moreover, while the front connection portion 6c and the rear connection portion 6d of the upper-side lower arm 6 are connected to the side member 11, the present invention may be configured such that three or more connection portions of the upper-side lower arm 6 are connected to the side member 11.

Also, while the rear side member 112 is configured to be weaker than the front side member 111 by setting the thinner plate thickness T3, T4 of the rear side member 112 relative to the plate thickness T1, T2 of the front side member 111, the rear side member 112 may be configured to be weaker by making the rear side member 112 from a weaker material, and the front side member 111 and the rear side member 112 may be joined together to form the side member 11.

Alternatively, the upper panel 111a of the front side member 111 and the upper panel 112a of the rear side member 112 may be formed integrally, and the plate thickness T3 of a portion which corresponds to the rear side member may be configured to be thinner than the plate thickness T1 of another portion which corresponds to the front side member.

Additionally, while the rear side member 112 is set as the weak portion of the side member 11, a portion of the side member 11 which is positioned in back of the front cross member 13 may be configured to have a constriction so that the deformation of the side member 11 caused by the rear collision load can be promoted, for example.

In correspondence between the present invention and the above-described embodiment, the arm member of the present invention corresponds to the upper-side lower arm 6 of the above-described embodiment. Likewise, the sub frame corresponds to the rear sub frame 10, the vehicle body corresponds to the floor frame 21, the portion of the side member which is positioned in back of the front cross member corresponds to the front side member 111, the weak portion corresponds to the rear side member 112, the plate thickness of the weak portion of the side member corresponds to the plate thickness T3, T4, and the plate thickness of the portion of the side member which is positioned in front of the front cross member corresponds to the plate thickness T1, T2. However, the present invention should not be limited to the above-described embodiment, and any other modifications or improvements may be applied within the scope of a spirit of the present invention.

What is claimed is:

1. A sub frame structure of a vehicle, comprising:
   a pair of right-and-left side members extending in a vehicle longitudinal direction, to which a pair of right-and-left arm members supporting right-and-left rear wheels are pivotally connected;
   a rear cross member having a pair of right-and-left side member holding members extending in a vehicle width direction, each of the pair of right-and-left side member holding members formed in a cylindrical shape, and an inward end of each one of the pair of right-and-left side member holding members contact an upper face, an outward side face, and a lower face of a respective one of the pair of right-and-left side member to hold a vicinity of respective rear ends of the pair of right-and-left side members; and
   a front cross member interconnecting the pair of right-and-left side members in a vehicle width direction and being positioned in front of the rear cross member, being spaced apart from the rear cross member,
   wherein a front end of each of said side members is rigidly connected to a vehicle body, said front cross member is joined to each of the side members at a position located in back of the vicinity of the front end of the side members, and a weak portion is provided at a portion of each of the side members which is positioned in back of the front cross member, the weak portion being configured to be weaker than another portion of each of the side members which is positioned in front of the front cross member.

2. The sub frame structure of the vehicle of claim 1, wherein a portion of each of said side members which is positioned between said front cross member and said rear cross member is configured to slant inward, in the vehicle width direction, relative to a vehicle longitudinal direction in a plan view.

3. The sub frame structure of the vehicle of claim 2, wherein said side members are provided to protrude rearward beyond said rear cross member.

4. The sub frame structure of the vehicle of claim 3, wherein each one of the pair of right-and-left side members extends obliquely forward and outward from a respective rear end such that a distance between the rear ends is relatively small and a distance between front ends of the pair of right-and-left side members is relatively large.

5. The sub frame structure of the vehicle of claim 2, wherein each of said side members is formed in a roughly tubular shape having an inside hollow space, and a thickness of said weak portion of the side member is configured to be thinner than that of said portion of the side member positioned in front of the front cross member.

6. The sub frame structure of the vehicle of claim 1, wherein said side members are provided to protrude rearward beyond said rear cross member.

7. The sub frame structure of the vehicle of claim 6, wherein each of said side members is formed in a roughly tubular shape having an inside hollow space, and a thickness of said weak portion of the side member is configured to be thinner than that of said portion of the side member positioned in front of the front cross member.

8. The sub frame structure of the vehicle of claim 1, wherein each of said side members is formed in a roughly tubular shape having an inside hollow space, and a thickness of said weak portion of the side member is configured to be thinner than that of said portion of the side member positioned in front of the front cross member.

9. The sub frame structure of the vehicle of claim 1, wherein each one of the pair of right-and-left side member holding members is welded on the upper face, the outward side face, and the lower face of the respective one of the pair of right-and-left side members.

10. A vehicle, comprising:
    a vehicle body;
    a pair of right-and-left side members extending in a vehicle longitudinal direction, to which a pair of right-and-left arm members supporting right-and-left rear wheels are pivotally connected, each one of the pair of right-and-left side members including a first, front end and a second, rear end;
    a rear cross member holding a vicinity of respective rear ends of the pair of right-and-left side members on a respective outward side of each one of the pair of right-and-left side members at a respective first location inward of an innermost end of each one of the pair of right-and-left arm members; and a front cross member connected to each one of the pair of right-and-left side members at a respective second location outward from the inward first location at which the respective rear ends of the pair of right-and-left side member are held by the rear cross member, interconnecting the pair of right-and-left side members in a vehicle width direction, the front cross member being positioned in front of the rear cross member, and the front cross member being spaced apart from the rear cross member, wherein a front end of each of said side members is rigidly connected to a vehicle body at a respective third location outward from the respective second location, said front cross member is joined to each one of the pair side members at a position located in back of the vicinity of the front end of the side member, and a weak portion is provided at a portion of each of the side members which is positioned in back of the front cross member, the weak portion being configured to be weaker than another portion of each of the side members which is positioned in front of the front cross member.

* * * * *